United States Patent [19]

Ivey

[11] Patent Number: 4,608,902
[45] Date of Patent: Sep. 2, 1986

[54] MEASURING AND CUTTING TOOL GUIDING DEVICE FOR USE IN THE FORMATION OF FIBER GLASS DUCTS

[75] Inventor: James H. Ivey, Levittown, Pa.

[73] Assignees: Charles E. Long, Croyden; Charles S. Austin, Bensalem, both of Pa.

[21] Appl. No.: 664,289

[22] Filed: Oct. 24, 1984

[51] Int. Cl.[4] .......................... B26D 3/06; B27G 13/14
[52] U.S. Cl. ........................................ 83/875; 83/745; 83/522; 144/136 R; 33/474
[58] Field of Search ...................... 83/875, 745, 522; 33/96, 112; 144/136

[56] References Cited

U.S. PATENT DOCUMENTS

| | | | |
|---|---|---|---|
| 2,436,111 | 2/1948 | Lowe | 83/875 X |
| 2,735,455 | 2/1956 | Forsberg | 83/745 |
| 3,124,176 | 3/1964 | Vogini | 83/745 X |
| 3,206,702 | 1/1967 | Feddish | 83/745 X |
| 3,242,780 | 3/1966 | Reid et al. | 83/875 X |
| 3,274,868 | 9/1966 | Williams | 83/875 X |
| 3,420,142 | 1/1969 | Gale et al. | 144/136 X |
| 3,515,019 | 6/1970 | Tyler | 83/875 X |
| 3,605,534 | 9/1971 | Barr | 83/875 X |
| 3,935,767 | 2/1976 | McClay | 83/875 X |
| 4,128,030 | 12/1978 | Kundikoff | 83/745 |
| 4,224,854 | 9/1980 | Malacheski et al. | 83/875 X |
| 4,379,419 | 4/1983 | Woock et al. | 83/875 |
| 4,411,183 | 10/1983 | Auer | 83/875 |

*Primary Examiner*—Donald R. Schran
*Attorney, Agent, or Firm*—Sperry, Zoda & Kane

[57] ABSTRACT

A guide provides a straight edge along which a cutting tool may be guided to form V grooves in fiber glass sheet material. The guide has indicia and line markings at spaced locations thereon, selectively alignable with the edge of the last previous groove cut in the sheet or panel. When the guide is so located, according to the transverse dimensions of the several walls of the duct that is to be formed from the fiber glass panel, it automatically accounts for the width of the cutting tool that is to be moved along the straight edge of the guide, to assure that the next V groove will be formed at an exact distance from the groove that was last cut.

2 Claims, 5 Drawing Figures

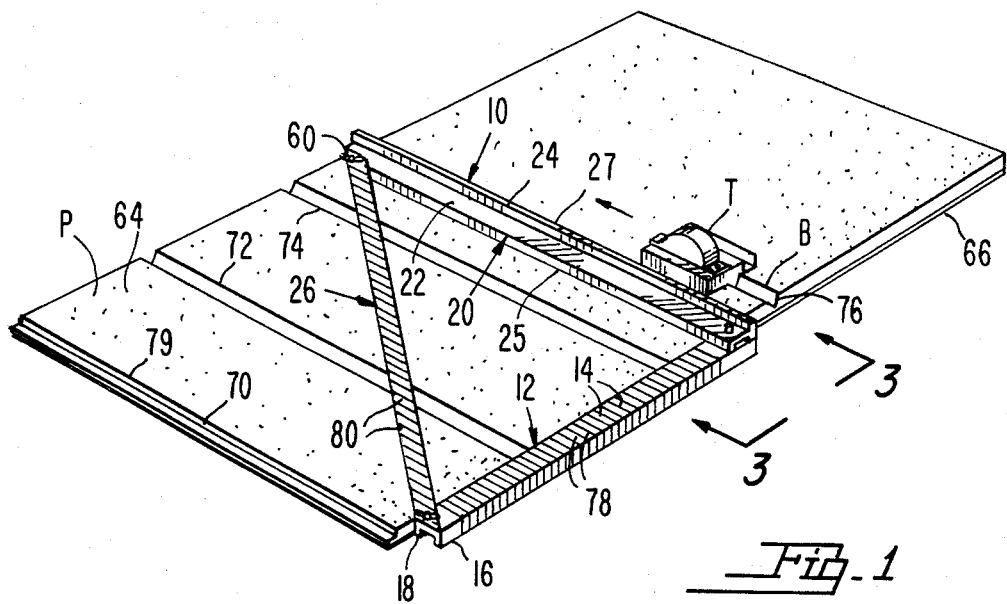
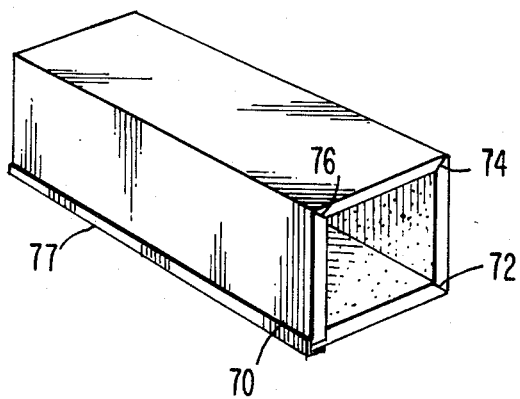
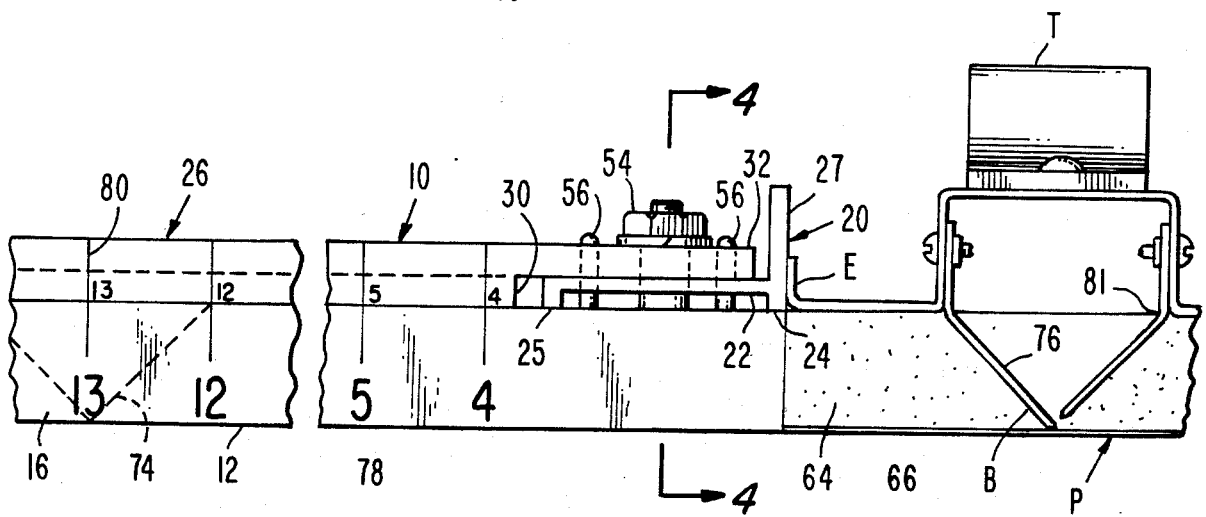

MEASURING AND CUTTING TOOL GUIDING DEVICE FOR USE IN THE FORMATION OF FIBER GLASS DUCTS

BACKGROUND OF THE INVENTION

1. Field of the Invention

The present invention relates generally to guiding devices, and in a more particular sense has reference to a device of this general nature that is intended specifically to be used in cutting fiber glass duct board. Even more particularly, the invention falls in that category of measuring and guiding devices wherein the guiding device has no moving parts, may be guided along the length of a fiber glass duct board panel in overlying relation thereto, and itself provides a straight guiding edge for a conventional cutting tool.

2. Description of the Prior Art

In recent years, heating and air conditioning ducts have come to be made in sections, each of which is of rectangular cross section and is formed from a single sheet of fiber glass panel material. The fiber glass panel from which the duct section is made typically is formed with a base of bendable aluminum sheet material, to which a relatively thick layer of fiber glass insulation is adhered. This material is provided, customarily, in the form of flat sheets.

In order to form a duct section from a panel of this type, the panel is laid out flat on the floor or on a table, and measurements are carefully made along the length of the panel, for the purpose of locating the centers of V grooves that are to be formed in the panel by means of a cutting tool. The cutting tool is usually of the hand-held type.

The V grooves extend to a depth such that the apices thereof terminate substantially at the base lamination. The base layer of the panel is itself not cut. Accordingly, after three V grooves have been formed at the proper locations, the panel is bent into a rectangular cross sectional shape. Opposite end edges of the panel are typically formed with shiplap grooves, that interfit when the panel is bent into its final form to provide the desired rectangular duct section. The shiplapped edges are then secured together, by taping the same over the full length of the duct section.

In the formation of ducts of this type, great care has been required heretofore, in making the required measurements on the flat panel, and in thereafter guiding the tool along lines marked upon the panel at the locations where the V grooves are to be cut.

The measuring of the panel must be carried out with great precision. If a measurement between adjacent V grooves is off even by a fraction of an inch, the resulting duct will not be perfectly rectangular, and will be incapable of being secured in abutting relation to adjacent duct sections.

It follows that it is equally a precision task to guide the cutting tool along the markings applied to the panel during the measuring phase of the duct manufacturing operation. For, even if the measurement is absolutely correct, the failure to guide the cutting tool with absolute precision along the marking again results in a misshapen duct section that would have to be discarded with an attendant, non recoverable expense in lost material and labor.

Recognizing these basic and important requirements in the formation of ducts of the character described, the industry has offered various solutions. For example, expensive and relatively complicated apparatus has been devised, which apart from the basic cost thereof, requires considerable set-up time and the adjustment of a large number of components during the measuring and cutting operation. Even so, apparatus of this type typically requires that the ductwork be manufactured in a shop setting, often great distances from the building job where the ductwork is to be ultimately installed. This involves, as will be readily understood, the transportation of completed ductwork by truck or other vehicle to the building site, at great expense and with considerable added possibility of damage being done to the ductwork before it can be put in place.

Other systems for the formation of ducts of this type have also been devised, which in the final analysis open up an overly great number of possibilities for human error. In these circumstances, in order to reduce the possibility of human error, it becomes necessary to utilize highly skilled labor, a step which obviously builds up the overall cost of the ductwork.

To overcome these deficiencies in the prior art devices used in forming fiber glass duct sections, it is proposed in accordance with the present invention to provide a very simple, lightweight, compact tool having no moving parts, and adapted to be carried to any job site to permit formation of ducts directly at the site, ready for installation without need of transport to another location.

A further important aim of the present invention is to so form the tool as to permit it to be used by unskilled, relatively low cost labor with relatively little instruction.

It is further proposed, in overcoming the deficiencies of the prior art apparatus, that the tool comprising the present invention be so designed as to reduce to a minimum the possibility of human error, even though relatively inexperienced labor, having only a short period of instruction, is used.

Another object of importance is to reduce to a minimum the total amount of time within which a flat panel is transformed into a completed duct section by eliminating the steps of pre-measurement and marking of the panel, and/or eliminating the necessity of pre-setting various components of a cutting machine or other apparatus before the actual cutting is performed.

SUMMARY OF THE INVENTION

Summarized briefly, the invention essentially comprises a frame of right-triangular form, in which the three legs of the triangle are all of a specially designed cross-sectional shape, and are separably but fixedly connected together in a precise angular relationship to form the completed tool. The connections of the several legs of the triangular frame to one another are so designed as to permit the frame to be broken down quickly or set up, so that when not in use it can occupy a very small amount of space and can be readily transported from one job site to another.

The frame described briefly above is so formed as to include, along a base leg, a series of gradations or indicia extending the length of the base leg, and having numerical markings in association with measuring line markings. The base leg is of channel form, and is of a depth equal to the depth of a conventional fiber glass panel, so that the base leg will be in flat face-to-face contact with the longitudinal edge of the panel over the full depth of the panel. With the base leg so located, a straight tool guide leg or member attached thereto will be disposed in exact perpendicular relationship to the length of the base leg and hence to the longitudinal edges of the panel. The tool guide member is so designed as to provide a vertical, perfectly straight surface along which the edge of a simple, manually held cutting tool can be guided to form V grooves in the panel.

On the so-called hypotenuse leg or member of the frame, gradations are formed over the full length thereof, that are in exact alignment with those on the base member. As a result, when the tool is properly positioned in overlying relation to a panel, the corresponding indicia of the hypotenuse member and the base member will line up precisely along the end edge of the panel or along a predetermined edge of the last V groove cut therein. If the distance between V groove centers is to be, for example, 16", the indicium of the base member and of the hypotenuse or connecting leg of the frame, bearing the numerical marking "16" will be lined up with the predetermined edge of the end groove or V groove, and this will locate the cutting blade of the manually held tool precisely where the next V groove is to be cut. Thus, the gradations on the frame take into account the distance between the guiding edge of the tool guide leg or member of the frame, and the center of the V shaped cutting blade of the manually held tool guided along said edge. In this way, all necessity for pre-measuring and marking the panel is dispensed with, with great savings in time, and with minimizing of the possibility of human error, while yet accomplishing these desirable aims in a tool of very low cost, capable of being used in situ.

BRIEF DESCRIPTION OF THE DRAWINGS

While the invention is particularly pointed out and distinctly claimed in the concluding portions herein, a preferred embodiment is set forth in the following detailed description which may be best understood when read in connection with the acompanying drawings, in which:

FIG. 1 is a perspective view of a fiber glass panel and of a combined measurement tool and cutter guide formed according to the present invention, together with a cutting tool, as they appear in operative relationship during the cutting of V grooves in the panel;

FIG. 2 is a perspective view of a fiber glass duct formed from the panel illustrated in FIG. 1;

FIG. 3 is an enlarged, fragmentary elevational view of the combined measurement and cutter tool guide as seen from line 3—3 of FIG. 1, the fiber glass panel and cutting tool being illustrated fragmentarily in elevation, the scale being enlarged above that used in FIG. 1;

panel; and guiding the cutting tool during its formation of a V groove in the panel.

To this end, the tool when in use is disposed in overlying relation to a flat panel P which in and of itself is of conventional manufacture and is specifically designed for the manufacture of a section of a heating or air conditioning duct. Considering first the specific construction of the tool itself, this includes a base member 12 formed as an elongated, straight, inverted channel the height of which is selected to match the overall thickness of the panel that is to be grooved with the aid of the present invention, and thereafter formed into a completed duct section illustrated in FIG. 2. Typically, the overall thickness of panel P is on the order of about 1", so the height of the base member would, in these circumstances, perferably be 1" also. In this way, the base member will be in flat, face-to-face contact along one side wall thereof, with the full thickness of the panel, for a substantial length of the panel, said contact extending over the full length of the base member or leg 12 of the tool 10.

Figure 4:
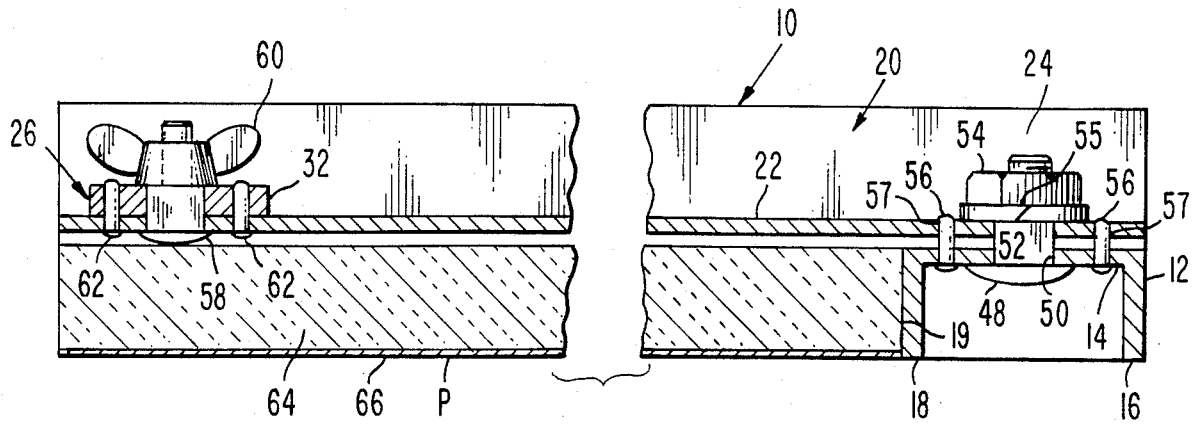
FIG. 4 is an enlarged, fragmentary view on the same scale as FIG. 3 taken substantially on line 4—4 of FIG. 3.

To this end, and referring specifically to FIG. 4, it will be seen that when viewed in cross section, the base member 12 includes a flat top wall or web 14, an outer side wall 16, and an inner side wall 18 that is disposed in face-to-face contact with the adjacent longitudinal edge 19 of the panel P.

The extensive interface area of the base member 13 and panel P in and of itself promotes precision location of the tool in respect to the panel and in turn aids in a corresponding precision formation of the desired V grooves in the panel, even though relatively unskilled labor may be used.

Designated at 20 is a second main component of the tool 10, which may appropriately be designated as a cutting tool guide member. This is in the form of an elongated, straight, rigidly constituted element, which as shown in FIG. 3 includes a flat, horizontally disposed web 22 overlying the top wall or web 14 of base member 12, and spaced a very short distance upwardly from the upper surface of web 14 perhaps $\frac{1}{8}$", through the provision of short, depending lips or flanges 24, 25 extending the full length of member 20. The flange 24 is continued upwardly above the plane of the body or web 22 of member 20, as shown in FIG. 3, a substantial distance, providing a guide wall 27 extending perpendicularly to the length of the base member 12, and having a flat outer surface designed to provide a smooth guide surface in slidable contact with the adjacent longitudinal, flanged edge E (FIG. 3) of a conventional, manually held cutting tool T having a V-shaped cutting blade B extending in parallel relation to the flange E and hence to the guide wall 27.

The third main component of the tool comprising the present invention is a connecting member generally designated 26. The connecting member 26 preferably is disposed in inclined or angular relation to both the base member 12 and the cutting tool guide member 20. Thus, in a preferred embodiment, when the three main comexample, rectangular, in which event the connecting member 26 would itself be of right-angular form, so long as it would provide means that would extend as a rigid connecting element between the base member 12 and the cutting tool guide member 20, assuring to the maximum extent that they will remain in a precise perpendicular relationship to each other over the complete effective life of the tool.

In any event, in the illustrated, preferred embodiment, the several frame elements 12, 20, 26 are detachably connected together in such a way as to further add to the rigidity, strength, and precise angular relationship that they bear to one another for the purpose of assuring correspondingly precise formation of duct sections such as that shown in FIG. 2. Thus, member 26 is also of a strong, rigid formation, including a web portion 28 (see FIG. 5) integral with depending flanges or lips 30, 30 along its opposite longitudinal edges, imparting to the member 26 a strong, inverted channel shape to assure to the maximum against undesired bending or breakage thereof during the rough use that would normally be made of a tool of this type over a long period of time.

At one end, the member 26 is formed with a longitudinal extension or tongue 32 (see FIG. 3), that is, the flanges 30 terminate short of the end of the web 28, to define the tongue 32. Tongue 32 is disposed in overlying relation and in face-to-face contact with the web portion 22 of the cutting tool guide member 20. Then, these components of the frame are separably connected together in a manner that will assure against their moving out of a precisely determined angular relationship to each other.

Figure 5:
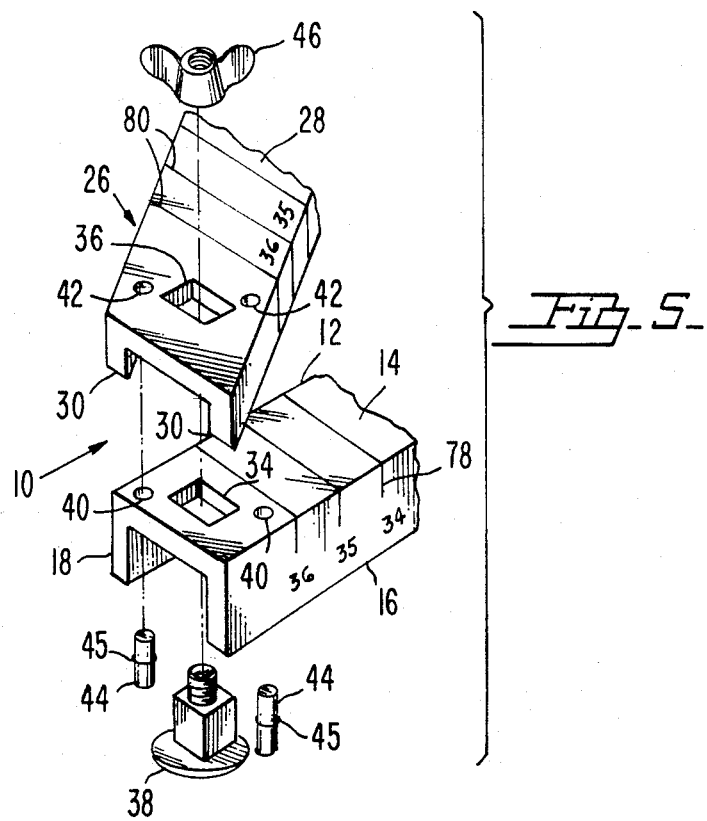
FIG. 5 is an enlarged, fragmentary exploded perspective view showing the preferred mode of joining the connector and base members.

The manner in which these members are joined, and for that matter, the manner in which joints are formed at the three corners of the frame, is perhaps illustrated to best advantage in FIG. 5. Here, the other end of member 26 is illustrated, that is, the end of said member that is connected to the base member 12. As will be noted, the member 26 overlies the web portion 14 of the base member 12, and in this area wherein the member 26 overlies the base member, the base member is formed with a square opening 34, adapted to be disposed in exact registration with a square opening 36 when the member 28 is disposed at the appropriate, predetermined angular relationship to the member 12.

At this time, there will also be brought into registration a pair of openings 40 disposed adjacent the opening 34 in the member 12, and a pair of openings 42 correspondingly located in the web portion 28 of the member 26. Pins 44 are extended upwardly within the openings 40, and are swaged into position within the openings 40 as at 45. The pins thus project upwardly from the xember 12, so that the upper ends of the pins will extend into the openings 42 to properly register the openings 34, 36 with each other.

A carriage bolt 38 is extended upwardly through the registered openings 34, 36, and a wing nut 46 is applied to the upwardly projecting portion of the carriage bolt, to complete the rigid, strong connection of the members 26, 12 to each other. At the same time, a precise angular relationship of the member 26 to the member 12 is obtained, and will be effectively maintained whenever the device is in use, to assure that precision location of the cutting tool T, and precision cutting of the V grooves, will be achieved.

The base member 12 is similarly connected, at its opposite end, to one end of the cutting tool guide member 20 (see FIG. 3). Here, one may note that a carriage bolt 48 extends through square, registered openings 50, 52 formed in the base member and cutting tool guide member respectively, after which a nut 54 may be applied to the carriage bolt. A lock washer 55 can be interposed between the nut 54 and the web portion 22 of member 20, as shown in FIG. 4. It will also be understood that a lock washer could be used in association with the wing nut 46 illustrated in FIG. 5.

The connection or joint between the members 12, 20 utilizes a conventional hex nut 54, rather than a wing nut, in the illustrated example. However, a wing nut could be employed if desired instead of utilizing a hex nut such as that shown. Again, however, it is desired at the location of the joint between the base member 12 and the cutting tool guide member 20, that guide pins 56, 56 be employed. These are swaged or otherwise fixedly secured to the web portion 14 of member 12, and project upwardly therefrom so as to be received in openings 57 formed in web portion 22 of member 20, thereby disposing the square openings 50, 52 in exact registration, and assuring that when the members 12, 20 are connected, they will be disposed in a precisely predetermined right-angular relationship to each other.

At the joint between the cutting tool guide member 20 and the connecting member 26, a similar fastening means is utilized, in the form of a carriage bolt 58 (see FIG. 4) extending upwardly through registered, square openings formed in the tongue 32 and web portion 22 respectively, there being also provided aligning pins 62 swaged to web portion 22 and received in openings formed in the tongue 32. A wing nut 60 is applied to the carriage bolt, to complete the connection, and to facilitate knock-down of the device when it is to be stored or transported elsewhere.

A device formed as illustrated and described has highly desirable characteristics of rigidity, and incapability of deviation from a prescribed angular relationship of the three main components thereof to one another. As a result, when the base member 12 is positioned in face-to-face contact with one longitudinal edge of panel P, complete assurance is provided that the guide surface or wall 27 will be disposed in exact perpendicular relationship to the longitudinal edge of the panel, to assure that the cutting tool will be guided along a correspondingly perpendicular line relative to the length of the panel.

The panel P, as previously noted, is conventional, and comprises a thickness 64 of fiber glass, adhesively or otherwise bonded to a metallic backing 66. This is a completely conventional type of panel material used in the formation of a duct section such as shown in FIG. 2, and typically, the overall thickness of the panel will be on the order of about 1 inch, a dimension which is matched by the height of the channel used to form the base member 12.

In use, as a first step the sheet would be formed along one end edge thereof with a ship-lap groove 70, by means of a cutting tool applied along said edge, this cutting tool being omitted from the present drawing since its use does not require that it be guided by the device formed in the present invention. Rather, the rabbeting cutting tool used in forming the ship-lap groove 70 is simply guided along the end edge of the panel, forming the ship-lap groove 70 over the full transverse dimension of the panel.

After this edge is formed, the tool comprising the present invention is put into use. It is disposed in overlying relation to the panel as shown in FIG. 1, and it is positioned according to the particular dimensions of the duct as viewed in cross section. For example, if the duct is to be 16 inches square, with ship-lap grooves 70 at one corner of the duct and with V grooves 72, 74, 76 at the remaining corners thereof, then the frame is positioned over the panel in such a way as to cause indicia marked upon the base leg and upon the connecting member 26, to be disposed along the edge of the groove 70. If as previously noted the duct is to be 16 inches square, then one would locate an indicium 78 provided upon the base member 12, said indicium being that designated "16", so that said indicium is in direct line with the inside edge 79 of the ship-lap groove.

In these circumstances, as previously noted the "16" line marking provided upon the base member will align with the edge of groove 70, and at the same time, a corresponding indicia 80, also marked "16", provided upon the connecting leg 26, will also line up with groove 70 at a location on the panel P transversely spaced from the base member.

The indicium 16 is not 16 inches distant from the cutting wall 27. Rather, indicium 16 found upon the base leg will be spaced from the guide surface 27 a distance such that when the cutting tool T is applied against the guide wall, it will be located to cut a groove of V-shape in the thickness 64 but short of the foil backing 66, said groove having an edge 81 (see FIG. 3) spaced exactly 16 inches from the corresponding edge of the groove last formed in the panel.

Thus, measuring of the distance between grooves is automatically predetermined by the tool itself, without requirement of the use of pre-measuring and marking lines upon the panel, before applying a cutting tool thereto. One simply moves the frame from groove to groove, that is, one first positions the frame for cutting of the first groove, merely by locating the desired gradations 78, 80 in line with the appropriate edge of the groove last made. Then, one simply guides the cutting tool along wall 27, to form the next groove. Thereafter, one moves the device along the panel, to now locate the same gradation of the base member and of the connecting member along the appropriate edge 81 of the groove that has just been formed, and this will once again automatically locate the blade of the cutting tool so that it will be positioned for making the next following groove. In this way, with little training, relatively unskilled help can swiftly groove panels for the formation of duct sections such as those shown in FIG. 2.

After three V grooves have been formed, the final cut made is one that cuts completely through the panel, after which the panel is bent to the cross-sectional shape shown in FIG. 2. A tape 77 is thereafter applied to the ship-lap joint, and completes the formation of the duct section. Staples or other fastening elements may also be extended through the ship-lap joint, to further aid in strengthening the completed duct section.

A tool formed as illustrated and described has highly desirable characteristics, in that it is capable of manufacture at a very low cost, essentially comprising only three main components. These three components, in accordance with the present invention, are inexpensive yet strong, and are so connected as to precisely locate each of them in its proper angular relationship to the remaining components of the device.

Further, the construction of the device is such as to assure to the maximum extent that it will be disposed in proper relationship to both the panel that is being grooved, and the cutting tool. These relationships are of importance, first because it is important that there be a precise, automatic location of the tool in respect to the panel (i.e., the locations where the grooves are to be cut must be established automatically, with minimum possibility of human error); and secondly, the tool must be properly located to assure that the cutter will be guided properly along the line where the groove is to be formed.

To accomplish this, the base member has been formed as a channel, at a depth matching or closely corresponding to the panel thickness, so that the base member will slide along one longitudinal edge of the panel, in intimate face-to-face contact therewith over a maximum amount of contact area. At the same time, however, the cutting guide leg 20 and the connecting leg or member 26 are in overlying relation to the panel surface, but almost in direct slidable contact therewith. This locates these portions or components of the device where they will assure to the maximum extent that the indicia of the base member and the connecting member will extend to or very close to the upper surface of the panel. This assures to the maximum extent that the indicia or line markings on the base member and the connector member will be visually perceived directly against the upper surface of the panel, and hence directly in line with the appropriate edge of the last groove that would be cut in the panel.

This is achieved by providing, in association with a base member that lies against an edge of the panel but does not rise above the top surface thereof, a cutting guide leg which in cross-section is in the form of a shallow inverted U, and a base member leg which is also in cross-section in the shape of a shallow inverted U, but which lies in the same plane as the cutting guide leg due to the provision of the tongue on one end of the connector leg, and the termination of the flanges of the connector member short of the joint between the connector member and the cutter guide leg or member.

Further accuracy in use of the device and minimizing of human error is achieved by the fact that the several members are connected together in such a way as to assure their precise angular relationship, that is, registering square openings are provided where the members are joined, receiving carriage bolts in association with guide pins located at opposite sides of and in close proximity to the registered, square openings.

Of great importance, of course, is the entire basic concept of the device, wherein the gradations provided upon the base member and upon the connector leg are so located that when they align with a selected edge of a groove already cut, a cutting tool of predetermined width located against the guide surface of the member 20 will have its blade located to cut the next groove at the exact distance from the groove last cut as denoted by the selected gradation or indicium.

All this is achieved, as will be readily understood, by a device that automatically measures off the groove locations, and properly locates the guiding tool in respect thereto, so that the grooves will be cut at the exact location desired, and so that the tool will be accurately guided during the making of the cut in the thickness of fiber glass.

While particular embodiments of this invention have been shown in the drawings and described above, it will be apparent, that many changes may be made in the form, arrangement and positioning of the various elements of the combination. In consideration thereof it should be understood that preferred embodiments of this invention disclosed herein are intended to be illustrative only and not intended to limit the scope of the invention.

I claim:

1. A device for locating and guiding a tool used for cutting grooves in panels that are to be bent at the groove locations to form air-conditioning ducts or the like, said panels having flat faces in which said grooves are to be cut and having straight longitudinal edges, said device comprising a frame that includes:

(a) a base member in the form of an elongated, straight bar rigid from end to end thereof, said bar having a flat top surface and having a straight side surface, said bar being of a thickness permitting disposition of the same no higher than the plane of the face of the panel with said top surface coplanar with said face and said side surface in longitudinally slidably contacting relation with one of the longitudinal edges of the panel, the top surface of the bar having numerical indicia permanently applied thereto, any one of which is alignable with an edge of the groove last cut in the panel and when so aligned will represent the distance to the corresponding edge of the next groove that is to be cut; and (b) an elongated, straight cutting tool guide member the length of which is greater than the transverse dimension of said panel, said guide member being rigidly connected to said base member and extending in perpendicular relation thereto wholly above the plane of the top surface of the base member in position to extend across the face of the panel, said guide member having a guide surface disposed in close proximity to the face of the panel when the top surface of the base member is coplanar with the face of the panel, for guiding the movement of a V-groove cutting tool across the face of the panel with said tool held in slidable contact with the guide surface, each indicium being spaced from said guide surface a distance such that with a selected indicium aligned with an edge of the V-groove last cut and with a companion cutting tool disposed in slidable contact with said guide surface, the blade of the tool will be in position to form a V-groove having an edge corresponding to said edge of the groove last cut and spaced therefrom the exact distance signified by the selected indicium.

2. A device as in claim 1 further including a connecting means extending between the guide member and base member and rigidifying the connection thereof in perpendicular relation to each other, said connecting means including indicia corresponsing to those of the base member, corresponding indicia of the connecting means and base member being aligned along lines parallel to the length of the guide surface at distances from each other less than the length of the V-groove last cut, so as to be alignable with said edge thereof at spaced locations along said edge.

* * * * *